Figure 1:
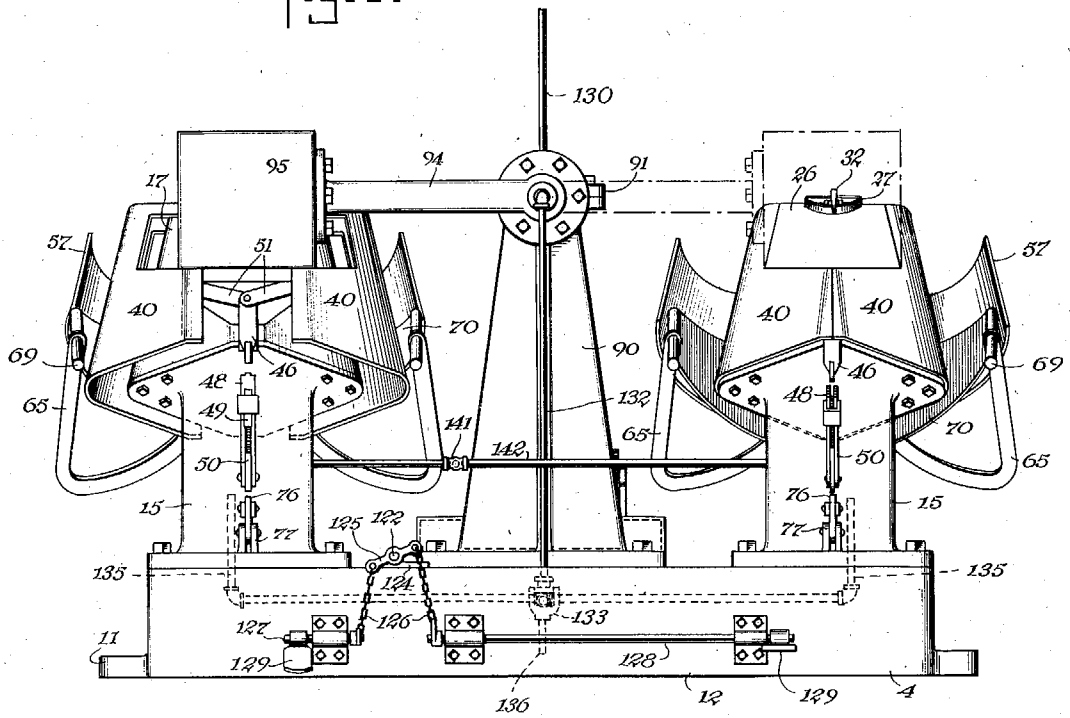

C. H. BOYULS.

SHIRT BOSOM AND BODY MACHINE.

APPLICATION FILED NOV. 19, 1921.

Reissued July 4, 1922.

15,395.

5 SHEETS—SHEET 1.

Inventor
Cecil H Boyuls
By J Harkan
Attorney

C. H. BOYULS.

SHIRT BOSOM AND BODY MACHINE.

APPLICATION FILED NOV. 19, 1921.

Reissued July 4, 1922.

15,395.

5 SHEETS—SHEET 2.

Inventor
Cecil H. Boyuls
By J. Harkom
Attorney

C. H. BOYULS.

SHIRT BOSOM AND BODY MACHINE.

APPLICATION FILED NOV. 19, 1921.

Reissued July 4, 1922. 15,395.

5 SHEETS—SHEET 3.

Inventor

Cecil H. Boyuls

By J. Harkom

Attorney

C. H. BOYULS.
SHIRT BOSOM AND BODY MACHINE.
APPLICATION FILED NOV. 19, 1921.
Reissued July 4, 1922.
15,395.
5 SHEETS—SHEET 4.
Fig. 5.
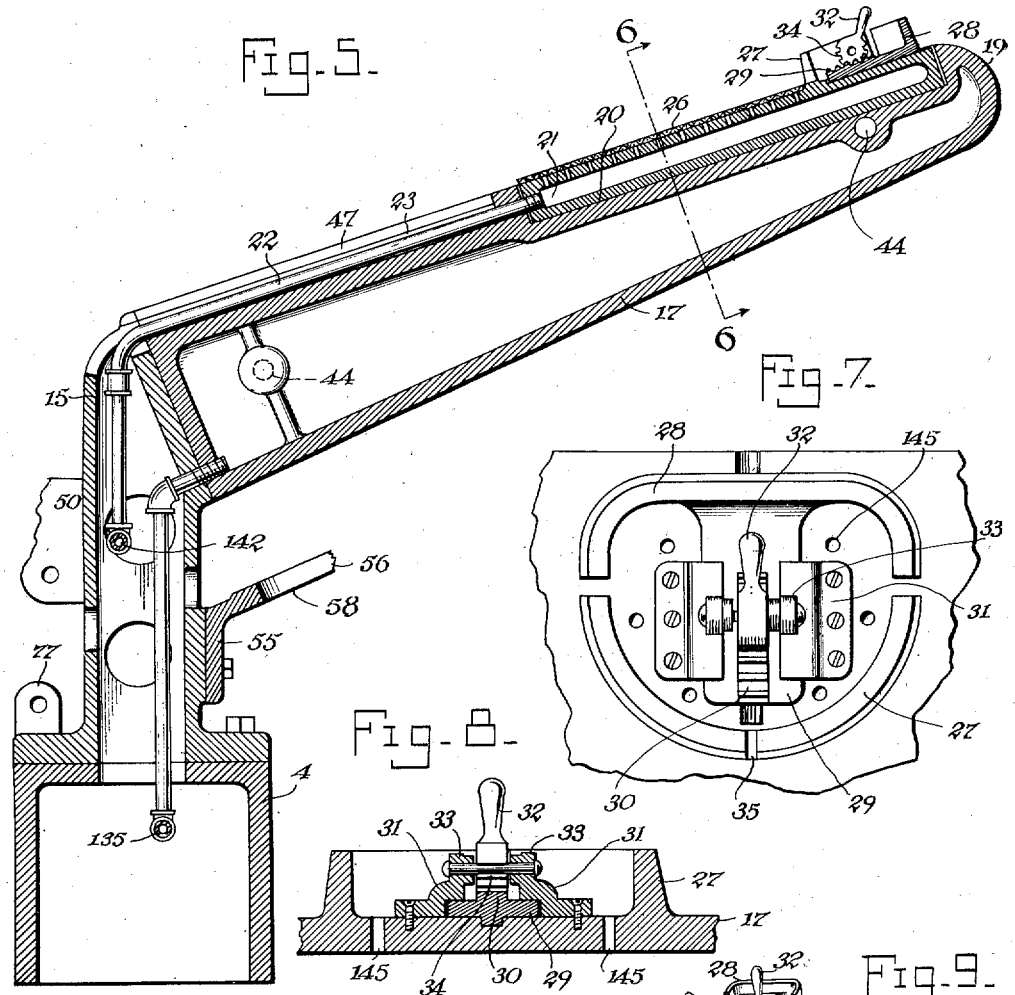
Fig. 7.
Fig. 8.
Fig. 9.
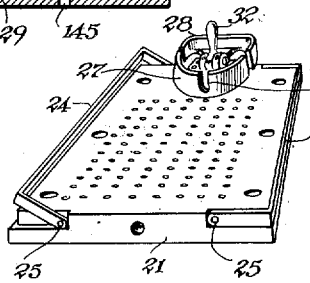
Fig. 6.
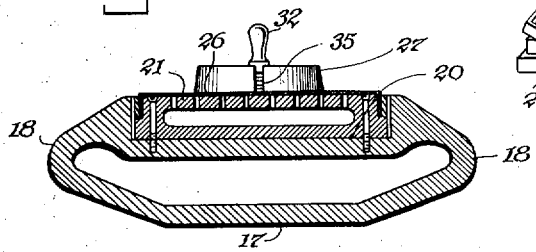
Inventor
Cecil H Boyuls
By J. Clarkson
Attorney

C. H. BOYULS.

SHIRT BOSOM AND BODY MACHINE.

APPLICATION FILED NOV. 19, 1921.

Reissued July 4, 1922.

15,395.

5 SHEETS—SHEET 5.

Inventor

Cecil H Boyuls

By J. Clarkson

Attorney

UNITED STATES PATENT OFFICE.

CECIL H. BOYULS, OF LOUISVILLE, KENTUCKY.

SHIRT BOSOM AND BODY MACHINE.

15,395. Specification of Reissued Letters Patent. Reissued July 4, 1922.

Original No. 1,357,218, dated November 2, 1920, Serial No. 380,488, filed May 11, 1920. Application for reissue filed November 19, 1921. Serial No. 516,486.

*To all whom it may concern:*

Be it known that I, CECIL H. BOYULS, a citizen of the United States, residing at Louisville, county of Jefferson, and State of Kentucky, have invented a new and useful Shirt Bosom and Body Machine, of which the following is a specification.

This invention relates to machines adapted to iron the bosoms and bodies of shirts at one operation.

An object of this invention is to provide a machine wherewith the bosom and the body of a shirt may both be ironed at the same time.

A second very important object of this invention is to provide a machine for purposes of this character wherein there will be provided a garment form of expansible nature, one member of the form constituting a heat reservoir and the remainder of the form deriving its heat by contact with or coaptation with the heat reservoir portion.

A third very important object of the invention is to provide an improved device of this character wherein the entire body of a garment, such as a shirt or the like, may be treated in one operation to completely smooth the body at all desired points and thereby produces an effect equal to the best hand iron.

Another object is to provide a machine as characterized having a shaped heated form having expansible members about which a shirt may be placed and the members then expanded, thereby distending the body of the shirt so that all wrinkles are removed.

A further object is the provision of a machine as characterized having a heated form over which a shirt may be drawn, and having means associated therewith whereby the tails of the shirt may be smoothed out and maintained in contact with the form.

With the foregoing and other objects in view, the invention consists of the novel construction and arrangement of parts illustrated in the accompanying drawings, comprising 5 sheets, which form a part of this specification, wherein is set forth an embodiment of the invention, but it is to be understood that such changes and modifications may be resorted to as come within the scope of the appended claims.

In the drawings, wherein similar reference characters designate like parts in the several views:

Figure 1, is a front elevation of an embodiment of the invention, showing the wings on one form as closed and on the other forms as opened out.

Figure 2:
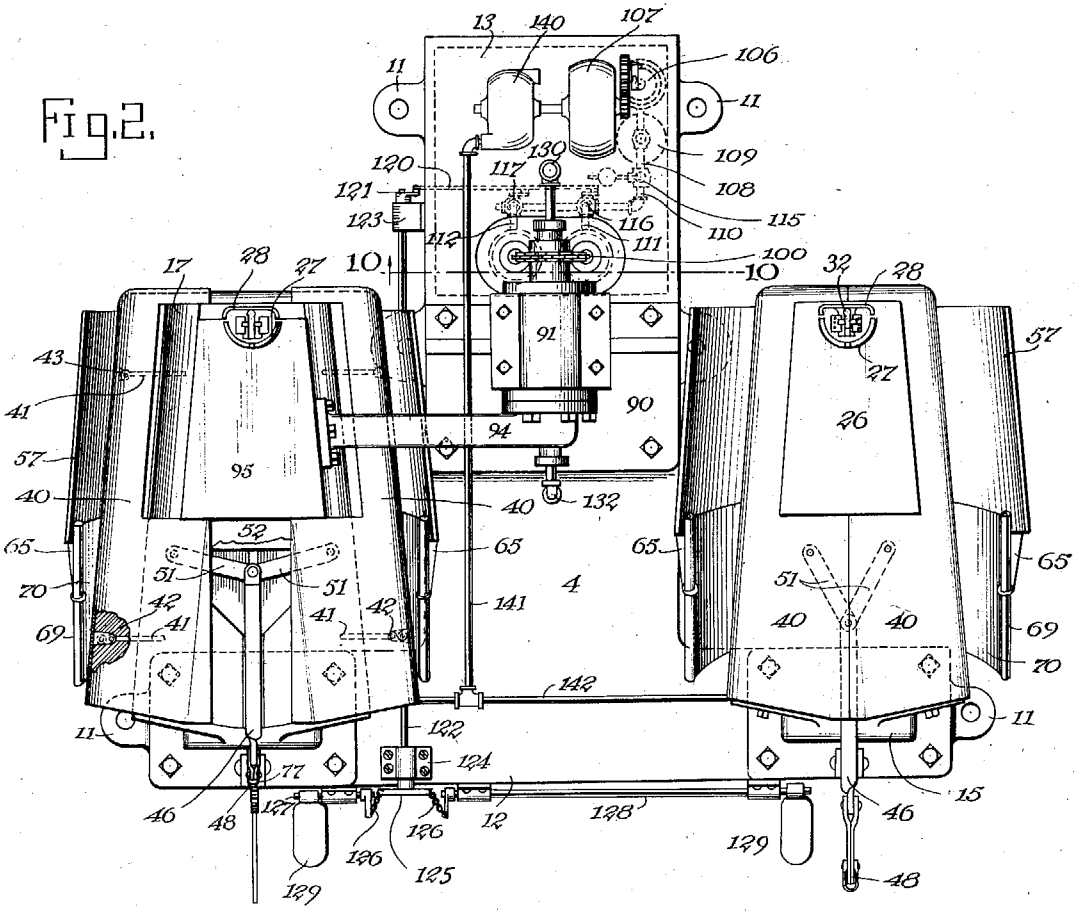

Fig. 2, a top plan view of same.

Figure 3:
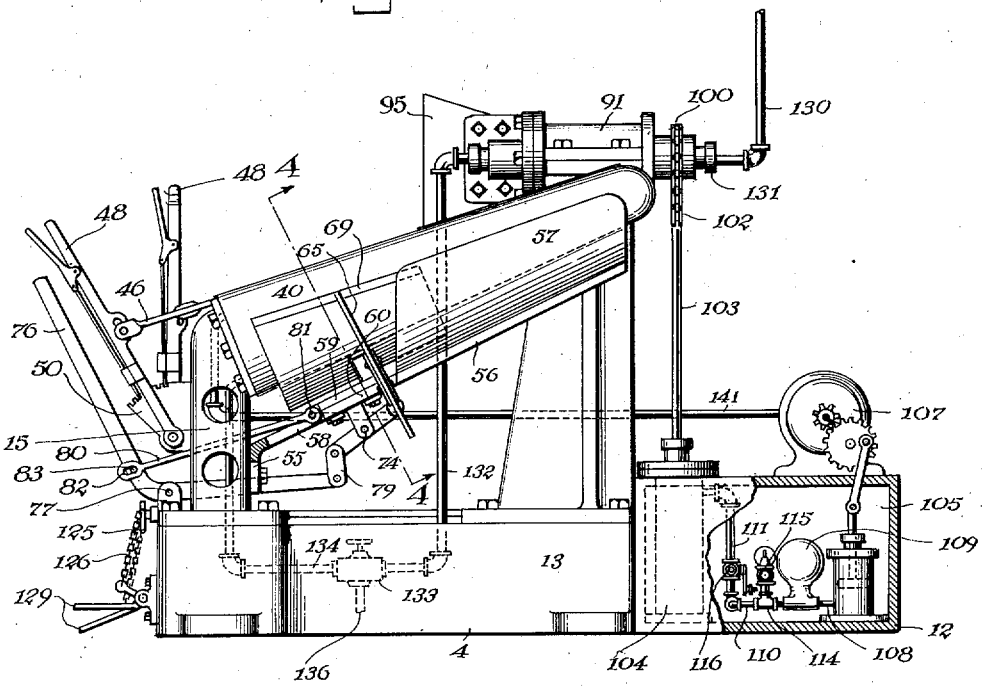

Fig. 3, side elevation with parts broken away.

Figure 4:
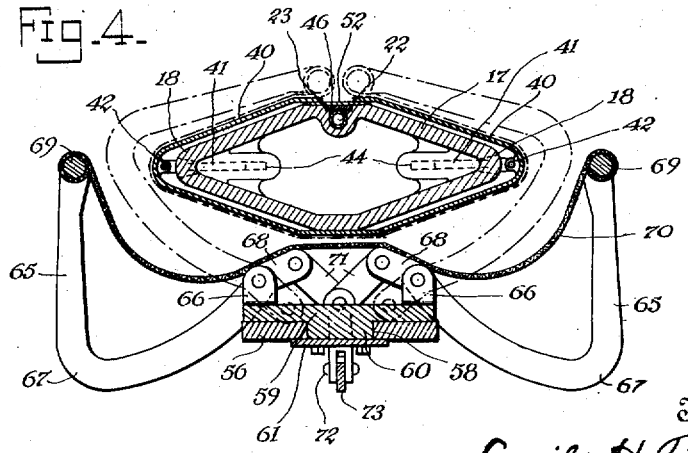

Fig. 4, a section on line 4—4 of Fig. 3, showing the apron as open, in full lines and closed in dotted lines.

Fig. 5, a central longitudinal section through a pedestal and horn, with some parts broken away and others omitted.

Fig. 6, a section on line 6—6 of Fig. 5.

Fig. 7, a top plan view of the neck band holder.

Fig. 8, a section on line 8—8 of Fig. 7.

Fig. 9, a detached perspective view of bosom board.

Figure 10:
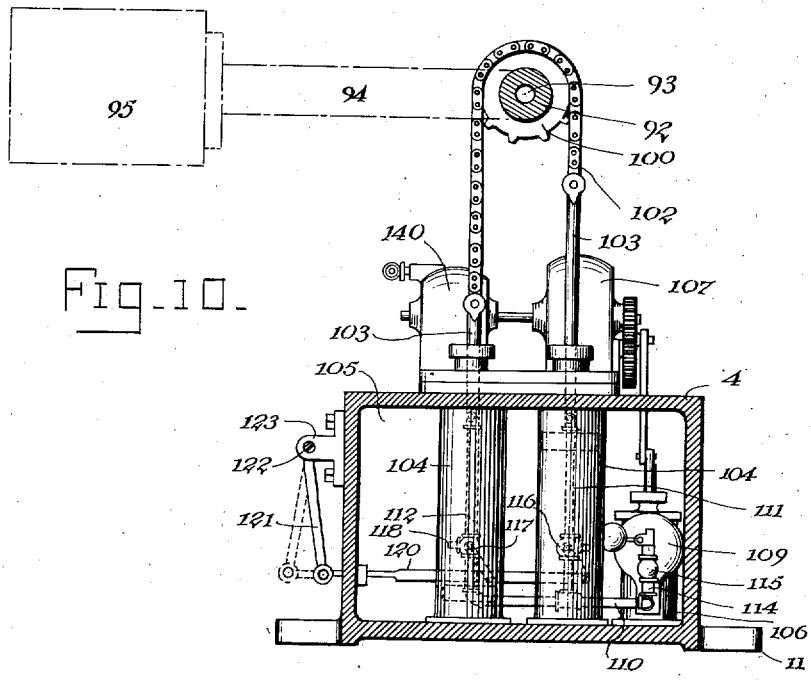

Fig. 10, front elevation partly in section of the bosom iron operating mechanism.

Figure 11:
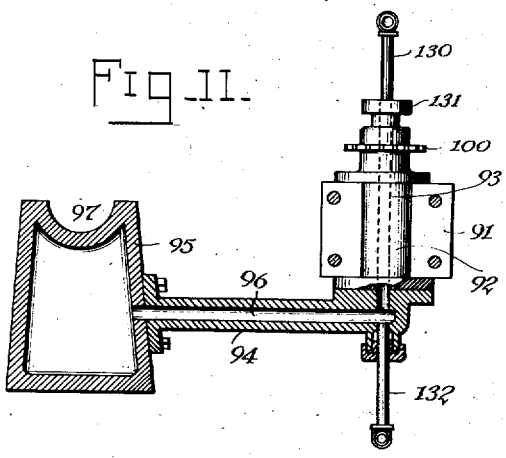

Fig. 11, central longitudinal section through bosom iron, arm and shaft.

Figure 12:
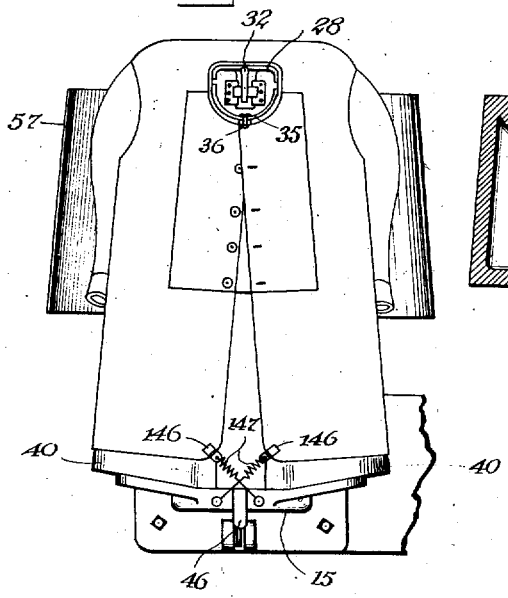

Fig. 12, a detached detail showing a shirt in position on a form.

The machine comprises a base 4 adapted to be secured to a foundation, or floor by means of bolts passing through laterally extending lugs 11. The base is preferably of cast iron, hollow, and is substantially T-shaped in plan, comprising a cross arm 12 and a stem 13. A pedestal 15 erected on each end of the arm, is cast hollow and is provided with openings in its walls which serve to reduce the weight and to afford access to the interior thereof. A horn, or form 17 is attached to the upper end of each pedestal and extends rearward therefrom with a suitable upward inclination. The horn is a hollow casting, having thick walls to withstand the steam pressure and to hold heat, and is of such length as to permit a shirt of maximum length to be placed thereon and its breadth is greater than its thickness, its dimensions being such as to receive a shirt of minimum size. A transverse section of the horn would be substantially a rhomb-ovate, or rhomboid with the outer angle 18 rounded. The upper end 19 of the horn is contoured to conform to the shoulders and yoke of a shirt when it is positioned thereon for ironing. A recess 20 is provided in the upper surface of the horn near its upper end within which a bosom board 21 is removably secured. The bosom board is a hollow casting provided with a plurality of perforations through its top, and is connected with a suitable source of air under pressure, by means of a pipe 22 which lies in a groove 23 in the top of the horn. A pair of latch bars 24 pivoted at 25 on the ends of the bosom board, provide means whereby to fasten a suitable fabric 26 across the top of the board to serve as a pad. A neck band former positioned on the bosom board near its upper end comprises a fixed semi-circular part 27 and a movable complementary part 28. The movable part is carried by a tongue 29, which is provided with rack teeth 30 and which is adapted to slide in guide members 31 secured to the bosom board. A hand lever 32 fulcrumed in ears 33 on the guides, is provided with teeth 34 which are operatively engaged with those in the tongues 29, whereby the movable part of the band may be moved to or from the fixed part, to accommodate the collar bands of different sized shirts. The fixed part is provided with a vertical slot 35 to receive the collar button 36 which connects the ends of the band of a shirt. A pair of wings 40, preferably formed of sheet metal, are so shaped that when in normal, i. e., closed position, they envelop substantially all of the horn, the bosom board excepted, and are heated by contact therewith. The wings are supported and guided in an opening, or spreading movement, by means of two pairs of rods 41 pivotally connected therewith at 42 42, in the apex of the angle, a spaced distance respectively from the upper and lower end thereof. The rods 41, are slidably disposed in bores 44 extended into the sides of the horn. A bar 46 slidably disposed in ways 47, centrally longitudinal of the form is adapted to be actuated by means of a lever 48 with which it is operatively connected. The lever 48, is mounted upon the pedestal and is adapted to be held in adjusted position by means of a latch 49 which is engaged with a quadrant 50. A pair of arms 51 are pivotally connected respectively with the bar 46 and with the respective wings. The arrangement is such that when the lever is pushed in, the wings will be pushed outward away from the horn, and when the lever is drawn back, the wings will be drawn back into contact with the horn. The sliding bar and arms lie below the surface of the horn and are covered by means of a plate 52, the horn and associated wings comprise a form over which a shirt may be drawn. A bracket 55 secured to the pedestal, a spaced distance below the horn, has an arm 56 which extends rearward therefrom in a plane substantially parallel with the horn and at its upper end supports a pan 57 so positioned as to catch and hold the depending sleeves of a shirt when it is placed on the form. The arm 56, of the bracket is provided with longitudinal slot 58. A plate 59 slidably positioned on the arm is guided in its travel by means of a rib 60 fitted in the slot. A plate 61 secured to the rib and bearing on the underside of the arm holds the plate in place. A pair of arms 65 are pivotally mounted upon ears 66 positioned on the upper end of the plate at the outer edges thereof. The arms each comprise a long angular member having a bend 67 and a short member 68. A rod 69 is secured to the outer end of each of the angular members. The rods lie parallel with the form and are of such length that they reach from the lower end of the bosom board to the point to which the longest shirt will come. A web 70 of suitable fabric, such as canvas is attached at its ends to the rods and constitutes an apron which is of such length as to be drawn tightly about the form when the arms are actuated. A pair of links 71 are connected respectively to the short members 68 of the arms 65, and to a link 72, which in turn is pivotally connected to one end of a lever 73, which is fulcrumed intermediate its length in a lug 74 which depends from the plate 59, through the slot 58. A substantially L shaped hand lever 76 is fulcrumed near its angle, in a lug 77, secured on the base of the pedestal. The end of the horizontal arm of the hand lever is connected by means of a link 79 with the end of the lever 73. The arrangement is such that a pull on the vertical arm of the hand lever will cause the angular members of the arms 65, to close about the form, stretching the apron tightly about the form. A rod 80 pivotally connected at 81 with the plate 59, has a lost motion connection with the hand lever 76, comprising a slot 82 in the rod, and a pin 83 on the lever. The arrangment is such that just as the apron closes about the form, traction will be exerted on the plate 59, drawing it and the entire structure carried by it, toward the base of the form, this movement being completed just after the apron is drawn taut about the form, whereby a fabric, such as the tails of a shirt, disposed on or about the form, will be smoothed out and firmly contacted therewith. A pedestal 90 positioned on the stem 13, of the base intermediate its length and midway between the two horns, is provided on its upper end with a journal box 91 in which a hollow shaft 92, is journaled, which has a central passage 93. To the forward end of the shaft, an arm 94 carrying a hollow iron 95 is secured, and a passage 96 in the arm connects the passage in the shaft with the interior of the iron. The width and length of the iron is substantially the same as the bosom board, it having a concavity 97 at its rear end corresponding with the neck band formers on the boards. It is thicker at its forward end than at its rear end to correspond with the inclination of the horns in order that its opposite faces which are highly polished, may contact uniformly with the face of the bosom boards as it is moved from side to side by rotation of the shaft. A sprocket wheel 100 is secured on the shaft in the rear of the journal box, a sprocket chain 102 is disposed thereon and depends therefrom. The ends of the sprocket chain are connected to plunger rods 103 which extend downward into cylinders 104 positioned in a chamber 105, in the rear end of the base. A pump 106 likewise positioned in said chamber is operatively connected with suitable movable means such as an electric motor 107 located on top of the chamber. A pipe 108 leads from the pump to an air chamber 109. A delivery pipe 110 leads from the air chamber and risers 111 and 112 lead from the delivery pipe to a connection with the cylinders 104, at the upper ends thereof. A stand pipe 114 projecting from the delivery pipe carries a pop valve 115 which may be regulated to permit the escape of fluid wherever the pressure exceeds a predetermined figure. Three way valves 116 117 are interposed respectively in the continuity of the risers and are connected by means of a rod 120 so that they may be actuated simultaneously. The arrangement is such that when one valve as 117, is set to permit fluid to enter the corresponding cylinder, the other valve is set to allow fluid to escape from its corresponding cylinder through a discharge 118. As fluid enters a cylinder, the plunger therein is forced down, and through the medium of the rod 103, and chain 102, the iron 95, is moved over and caused to contact with the bosom board, on the corresponding side of the machine with a pressure proportional to that of the fluid, at the same time the plunger in the other cylinder is drawn up forcing the fluid out of that cylinder. The rod 120, extends exterior of the chamber and is operatively connected with an arm 121 depending from a shaft 122 which extends to the front end of the base, being mounted in bearings 123, 124 positioned respectively on the side of the chamber (Fig. 10) and on the arm of the base (Figs. 1 and 2). On the forward end of the rod 122 is a yoke 125, the respective ends of which are operatively connected by means of flexible connectors 126 with a short shaft 127 and a long shaft 128 which are journaled on the front side of the base. These shafts are each provided with a pedal 129 conveniently located to be actuated by an operator. A pipe 130, which serves to conduct steam from a suitable source of supply (not shown) enters the hollow shaft 92, through a stuffing box 131, the steam flows through the passages 93 and 96, into the iron 95, heating it to a desired temperature. A pipe 132 leads from the forward end of the shaft to a steam trap 133 in the base and a pipe 134 leads forward from the trap to the branch pipes 135 which lead upward through the interior of the pedestals to connections with the horns and deliver steam thereinto. Water of condensation flows from the iron, and from the horns through pipes 132 and 135 and 134, to the trap and from thence through a pipe 136 to any suitable point of disposal. An air pump 140 is connected with the motor and air therefrom under pressure is led through a pipe 141 and its branches 142 to connections with the pipes 22, which lie in grooves in the upper sides of the horns and are connected to the bosom boards. Air escaping through the perforations 21, in the bosom board, serves to keep the pad 26 (Fig. 5) dry, and air issuing through openings 145 within the neck band serves to keep the handle 32 cool, so it can be handled. In operation a shirt which had been dampened, and properly conditioned for ironing, the neck band having been ironed in a customary manner, and its ends fastened together by means of a collar button 85, is drawn down over the form by an operator, until its shoulders contact with an end of the form. Its collar band is then disposed about the band former on the bosom board with the collar button engaged in the slot 35. The hand lever 32, is then actuated to move the complementary part backward whereby the shirt band is tautened, shifting of the shirt being thereby prevented. The shirt tails are then drawn down and smoothed out, the back tail lying on the apron. The two sides of shirt front diverge from the collar button downward, to an extent such that the bottoms on one side of the bosom lie clear of the other side, and the inner lower corners are engaged by suitable clasps 146 on the ends of elastic members 147. When the shirt is properly positioned on the form, the lever 48, is pushed inward, whereby through the medium of the bar 46, and arms 51, the wings 40 are moved outward from the horn. The wings 40 move in parallel lines until the upper ends thereof are stopped by contact with the shoulders of the shirt, when they are fully distended, then the lower ends continue the outward movement, pivoting on the connection 42, until the body of the shirt, which slopes from the shoulders downward, is distended. The lever 76 is then pulled outward, causing the apron 70, to be drawn about the form smoothing out the shirt tails in contact with the horn and distended wings.

The operator then depresses the appropriate pedal thereby actuating the valves 116, 117, and causing the iron to be brought into contact with the bosom of the shirt just positioned. He then steps over to the reverse form, whereon there is a shirt which has just been ironed and moves the levers 76, 48, and 32 in the reverse direction to that just described, thereby withdrawing the apron, and retracting the wings and releasing the collar band, whereupon that shirt may be withdrawn from the form. The body of the shirt having been, by the combined action of the wings and the apron, smoothly contracted throughout practically its entire extent—except the bosom and a narrow space thereabout, with the heated form, while damp, has been dried perfectly smooth, and the bosom has been suitably finished by pressure of the iron thereon. Another shirt is then placed on the form and the operations as described being repeated.

From the foregoing it will be observed that there has been provided a central body portion 17 which is termed the horn and that by reason of its having the thick walls previously mentioned it constitutes a heat reservoir. It will also be seen that the members 40 which are termed wings receive their heat by their movement into coaptation with the horn and that when the garment is distended between the expansion of these members 40 they give up their heat in the evaporation of the moisture from such a garment.

Having thus described my invention so that those skilled in the art pertaining thereto can make and use the same, I claim:

1. In a machine as characterized, a form adapted to have a garment distended thereabout and expansible distending means associated with said form and adapted to distend said garment to cause it to contact with the form and with the distending means.

2. In a machine as characterized, a form adapted to have a garment disposed thereabout, and means associated with said form and adapted to distend said garment to cause it to be disposed about one portion of the form, and other means to engage the garment to cause it to contact with the form and distending means.

3. In a device as characterized, a form, means for heating said form, wings normally closed about and heated by the form and means for moving said wings laterally in planes parallel with the form.

4. In a shirt ironing machine, a heated form, wings normally closed thereover, and means operable to move said wings outward from the form thereby distending the shirt and stretching it tightly thereabout.

5. In a shirt ironing machine, a heated form, wings normally closed thereabout, means operable to move said wings outward from said form thereby distending the body of the shirt disposed thereabout, and a web adapted to be drawn about the form and the wings to smooth the tails of the shirt out in contact therewith.

6. In a shirt bosom and body ironing machine, a plurality of forms, an iron, means for heating said iron and the forms, means for contacting the iron alternately with the forms, a web associated with each of the forms and means operable to adjust said web about a form to cause a fabric placed thereon to contact smoothly therewith.

7. In a shirt bosom and body ironing machine, a plurality of forms, an iron, means for heating said iron and the forms, means for contacting the iron alternately with the forms, wings normally closed about said forms, means associated with the respective forms operable to move said wings outward from the forms and a web associated with each of the forms and means operable to adjust said web about the associated form to cause a fabric placed thereon to contact smoothly therewith.

8. In a machine as characterized, a form, supporting members associated with and extensible from said form, wings conformable with the form carried by said members, a bar slidably associated with the form, arms pivotally connected respectively with the wings and with the bar whereby movement of the bar moves the wings from and toward the form, means for actuating the bar, levers pivotally mounted below the form the long arms whereof are so contoured as to extend about the respective sides of the form the terminals of said levers meeting over the form centrally and in proximity to the surface thereof, a web attached to the terminals of said arms adapted to be drawn about the form by the action of said levers, and means for actuating the levers.

9. In a device as characterized, a form, means for heating said form, wings normally closed about and heated by the form and means for moving said wings towards and away from the form.

10. In a garment former, a forming device consisting of an interior heated core, and stretching elements movable into contact with and away from said core, said stretching element being heated by said core when contacting therewith.

11. In a garment former, a forming device consisting of a heater member, having sufficient body to constitute when heated a heater in itself, and an expansive member movable to and from the heater member and heated thereby.

12. In a garment former device, a heat storing body and a stretcher member heated by and movable to and from the body.

13. In a garment former, a main body having high thermal capacity and a stretcher member of high thermal capacity and receiving its heat from the main body and means to adjust said body and member into and out of stretching relation.

14. In a garment former, a plurality of former members of high thermal capacity, one of said members being constructed and designed to constitute a heat reservoir, the other of said members being movable to distend a garment placed on the first member and being constructed and arranged to receive heat from the first member.

15. In a garment former, a plurality of former members of high thermal capacity, one of said members being constructed and designed to constitute a heat reservoir, the other of said members being movable to distend a garment placed on the first member and being constructed and arranged to receive heat from the first member by contact therewith.

16. In a garment former, a plurality of former members adjustable within a garment to distend the same and movable into and out of coaptation with each other, one of the members constituting a source of heat supply, the other member constituting a temporary heat reservoir, said second member receiving and storing heat when in coaptation with the first member and radiating stored heat when out of such coaptation.

17. In a garment former device, a heat storing body and an expansion member fitting about a portion of said body and heated by and movable to and from the body.

18. In a garment former, a heated body portion and adjustable garment distended members heated by said body portion.

CECIL H. BOYULS.